(12) United States Patent
Andersson

(10) Patent No.: US 6,204,804 B1
(45) Date of Patent: Mar. 20, 2001

(54) METHOD FOR DETERMINING OBJECT MOVEMENT DATA

(75) Inventor: Bengt Lennart Andersson, Kullavik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/429,016

(22) Filed: Oct. 29, 1999

(30) Foreign Application Priority Data

Oct. 30, 1998 (SE) .................................... 9803724

(51) Int. Cl.$^7$ ................................................ G01S 13/58
(52) U.S. Cl. ............................ 342/113; 342/58; 342/59; 342/60; 342/104; 342/115; 342/147; 342/175; 342/195

(58) Field of Search .......................... 342/59, 104, 107, 342/109, 113, 114, 115, 118, 134, 139, 147, 149, 175, 194–197, 25, 52, 58, 60

(56) References Cited

U.S. PATENT DOCUMENTS

| | | | |
|---|---|---|---|
| 4,611,211 | * | 9/1986 | Leitl et al. ........................... 342/107 |
| 5,870,053 | * | 2/1999 | Chamouard et al. .................. 342/25 |

* cited by examiner

Primary Examiner—Bernarr E. Gregory
(74) Attorney, Agent, or Firm—Burns, Doane, Swecker & Mathis, L.L.P.

(57) ABSTRACT

The velocity vector of a moving object is precisely determined by using radar measurements of the angle to and the radial speed of a moving object. This can be done in a radar system comprising one or more units. The technique also makes it possible to precisely determine the range to a moving object from a single moving radar unit.

7 Claims, 5 Drawing Sheets

METHOD FOR DETERMINING OBJECT MOVEMENT DATA

TECHNICAL FIELD OF THE INVENTION

The present invention relates to a method for determining the speed and the heading of a moving object and a method for determining the distance to a moving object.

The present invention is especially directed to aircraft radar systems, as well as to vessel- or vehicle borne radar systems and to stationary systems.

Generally, the invention is applicable to any field in which one wishes to gain information about a moving object.

BACKGROUND OF THE INVENTION

According to the pulse Doppler radar concept, the Doppler shift is used as a means for discriminating moving targets from undesired stationary objects.

Known pulse Doppler radars typically make use of microwave radar signals emitted at a certain pulse repetition frequency (PRF), whereby pulse trains are emitted at regular intervals. By utilising various forms of filtration, for instance using digital filter banks, the radial velocity of the object can be found. For so-called coherent pulse Doppler radars this is accomplished by comparing the phase value of the signal emitted by the radar with the echo signal.

If the main lobe emitted by the radar beam signal is directed against stationary objects, the radar will continuously receive signals or so-called clutter from these stationary objects.

In FIG. 1, which relates to signals obtained from a pulse Doppler radar, borne by moving radar platform F observing object T, the Doppler frequency shifts measured by the radar have been shown. Two peaks, relating to the received Doppler frequency shift of respectively the main lobe clutter, M, and the moving object, T, appear.

The difference between the object Doppler frequency shift and the clutter Doppler frequency shift can be visualised as the distance between the object and the clutter peak.

From the resulting difference, $f_d$, between the Doppler frequency shift relating respectively to the main lobe clutter, M, and the moving object, T, the radial speed, $v_r$, of the object can be calculated according to the relation:

$$f_d = \frac{2v_r}{\lambda}, \qquad (I)$$

where $\lambda$ is the microwave wavelength. The radial speed, $v_r$, of the given object can be expressed as $v_r = v \cdot \cos(\theta)$, where v is the object speed, and $\theta$ is the angle made by the object trajectory and the line joining radar and object.

It is noted that the above difference in frequencies and hence the radial speed measurement is independent of the speed of the radar platform.

When using a pulse Doppler radar on an aircraft this has the advantage that a moving object can be detected although the object is close to the ground or other stationary objects as seen from the radar. Consequently, the moving object can be detected with high reliability. This also applies to stationary radar platforms.

As is well known, the task of a typical radar system is normally not only restricted to detecting certain objects, but it should also provide for the detected objects position, speed and heading.

For pulse Doppler radars, the time it takes for a pulse train to travel to an object and back to the radar follows the relation:

$$t = \frac{2R}{c}, \qquad (II)$$

where R is the distance to the object, c is the speed of light and t is the period between an emitted pulse and the associated received pulse.

By measuring the time, t, it should be possible to find the distance to the object. However, since the pulse repetition frequency, PRF, typically is high for many radar systems, it is difficult to identify the echoes. Consequently, the distance to the object can in many instances not be resolved unambiguously.

In these cases, the range is resolved by means of other or by additional methods.

A particular pulse Doppler radar technique is the MPD (Medium PRF Pulse Doppler) mode, which operates in the range of 3–30 kHz PRF emitting microwave signals in the range of 1–10 cm.

By using so-called PRF switching, by which the object is illuminated with plural PRF's, the distance to the object and/or the radial speed of the object can be unambiguously resolved. However, this technique still leaves something to be desired, when it comes to the accuracy of the range information.

Another technique is the HPD (High PRF Pulse Doppler) mode in which the PRF is chosen so high that the objects radial speed can be obtained.

However, in order to provide an unambiguous determination of the distance to the object, it is necessary to modulate the pulse train. Unfortunately, this has the effect that the radar search performance is somewhat degraded.

Moreover, when using modulation, the accuracy of range information is not entirely satisfactory. Hence, this method leads in many radar systems to inaccurate position measurements.

According to well-known trigonometric methods, which are utilised in known radar systems, the position of an object can be determined by taking a bearing to the object and combining this measurement with a measurement of the objects range. The velocity vector of the moving object can be found from performing position measurements at different points in time.

Alternatively, conventional cross-bearings can be performed from dispersed radar units.

The accuracy of the resulting data will depend on the precision of the angular measurement and the range measurement. The position measurements will often be of limited accuracy. This in turn will result in poor accuracy of the calculated velocity vector or demand a long measuring time.

Moreover, if moving objects are close to one another and substantially have the same course and speed, there is a risk that these objects might not be distinguished from each other and that the velocity vector for any of the adjacent objects may be calculated erroneously.

In FIG. 2, this situation has been illustrated. If radar unit F1 measures the position of object T1 for calculating the course and speed of T1, there is a risk that radar unit F2 will falsely identify object T2 as T1. Consequently, the calculation of T1's velocity, corresponding to the dotted line, will be erroneous. The correct velocity of T1 is represented by the solid line.

SUMMARY OF THE INVENTION

One object of the present invention is to set out a method for accomplishing a precise determination of the velocity vector of a moving object.

It is another object to set out a method for providing the above data, which can be used by performing measurements from a single moving platform or more platforms.

It is a further object to accomplish a method for providing the above data based on measurements performed at one instance.

It is still a further object of the present invention to set out a method for accomplishing a precise determination of the position of a moving object.

According to the subject matter set forth in claim 1, there is provided a method for determining the velocity vector, that is, the speed and the angle of a moving object, by using input data from a radar system providing angle information and radial speed information of the moving object.

According to dependent claim 2, there is provided a method for determining object data using two radar units performing instantaneous measurements.

According to dependent claims 3 and 4 respectively, there are provided methods, in which respectively a single moving radar unit or more radar units are performing measurements at two or more different locations and instances.

As defined in dependent claim 5, there is provided a method for determining the distance to the object by advantageously using a single radar unit carried by a moving platform, alternatively using more units.

The methods according to the present invention provide very reliable and accurate results.

Further advantages will appear from the following detailed description and the appended claims.

DESCRIPTION OF A PREFERRED FIRST EMBODIMENT OF THE INVENTION

As mentioned above, one object of the present invention is to accomplish a method for providing movement data of an object by using measurements from two radar units being deployed with a certain minimum angle between them in relation to the object. These radar units may suitably be carried on moving platforms, such as aircrafts. Alternatively the radar platforms may be stationary or one of those may be moving, while the other is stationary.

Figure 3:
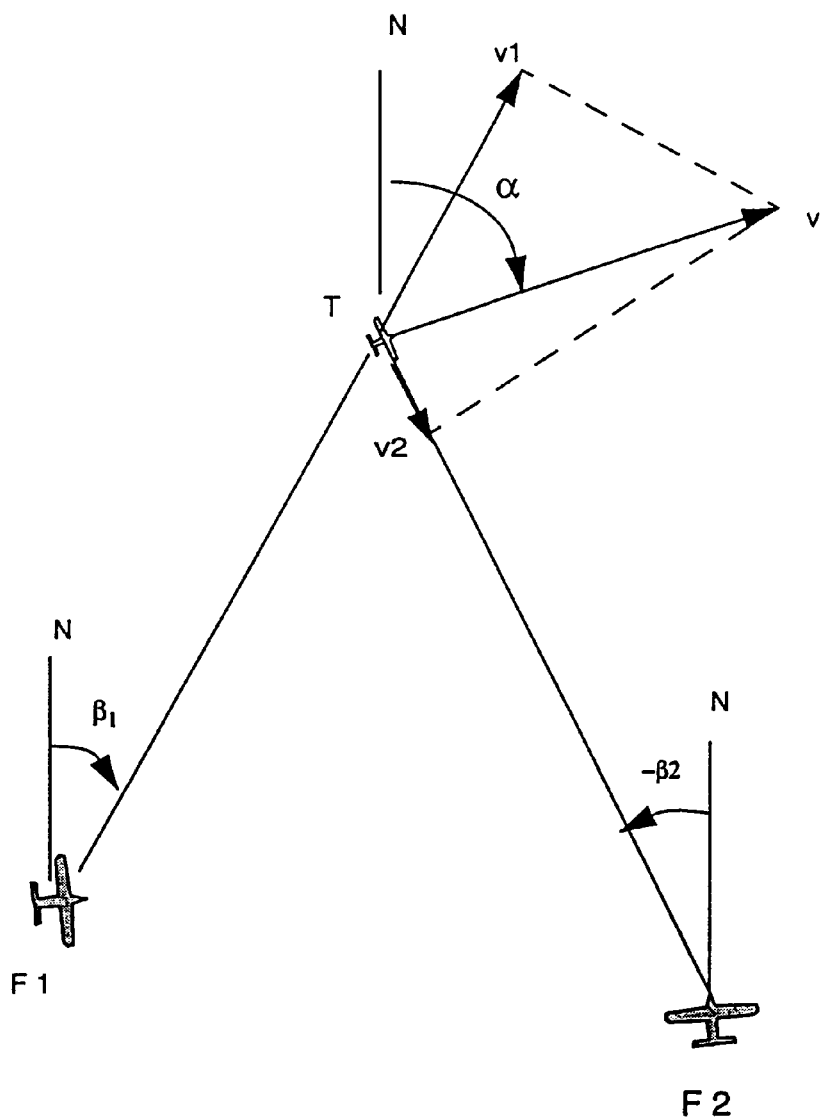

In FIG. 3 this situation has been illustrated. Each radar platform, F1 and F2, comprises a radar unit generating the radial speed of the object with respect to the ground and the angle to the object in relation to for instance an earth bound coordinate system, such as a co-ordinate system associated with for instance the geomagnetic or geographic north or any other system used for navigation.

In case the radar units are airborne, It should be understood that the radar platforms and the object to be observed might not necessarily be deployed at the same altitude. The appended figures and the associated parameters relate to a two-dimensional plane although the movements or paths of travel may actually take place in three-dimensional space.

The radial speed measurements can be obtained from conventional MPD or HPD radars or from any other known type of radar, which produce such radial speed measurements.

The angle to the object is advantageously produced by conventional radar means, which normally function in connection with an on-board navigation system, for instance a GPS system.

According to FIG. 3, the true speed v, the angle $\alpha$ of the moving object and the radial speeds $v_1$ and $v_2$ and the respective angles $\beta_1$ and $\beta_2$ measured from the platforms to the object with respect to a suitable co-ordinate system are defined according to:

$$v_1 = -v \cos(\alpha - \beta_1) \qquad \text{(III)}$$

$$v_2 = -v \cos(\alpha - \beta_1) \qquad \text{(IV)}$$

Solving III and IV with regard to $\alpha$ gives:

$$\alpha = tg^{-1}\left(\frac{v_2 \cos(\beta_1) - v_1 \cos(\beta_2)}{v_1 \sin(\beta_2) - v_2 \sin(\beta_1)}\right). \qquad \text{(V)}$$

Relation III can be expressed as:

$$v = -\frac{v_1}{\cos(\alpha - \beta_1)}. \qquad \text{(VI)}$$

Hence, the velocity vector of the object can be calculated.

The above calculations may take place in any of the radar units F1 and F2 or in any other movable or stationary system having the required computational and communication capabilities. Relation IV can also be used for calculating v, which is necessary if $\alpha = \beta_1 + 90°$ for instance.

It should be understood that the respective measurement data are transferred between the respective units by means of appropriate conventional communication means such as radio or wire.

Hence, the velocity vector of the object can be determined from one momentary set of measurements of the angle to the object and the radial speed of the object.

Figure 1:
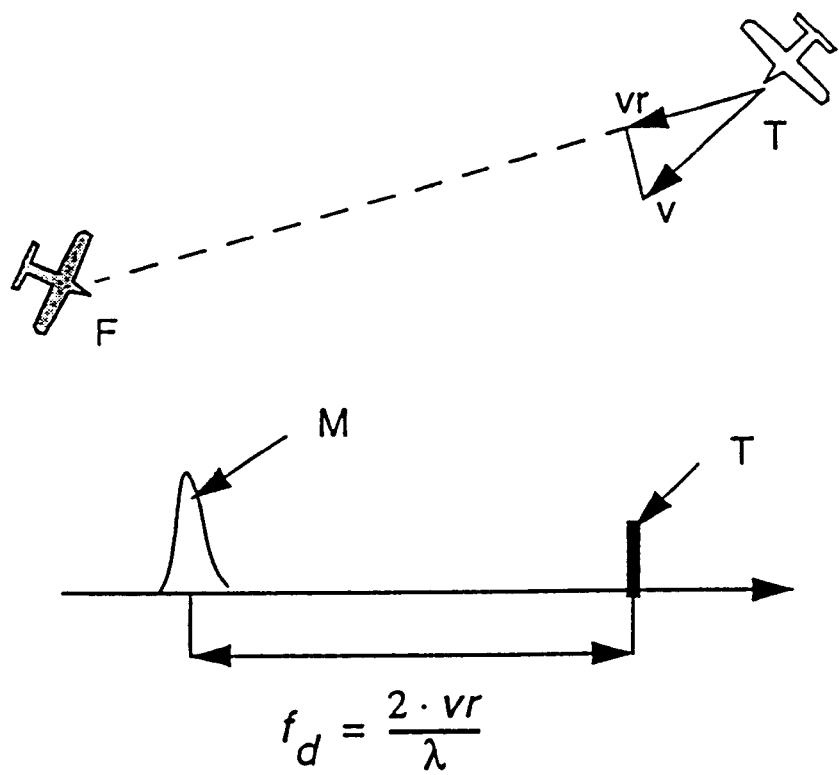
FIG. 1 is a schematic illustration of the received frequency spectrum for a known pulse Doppler radar.
Figure 2:
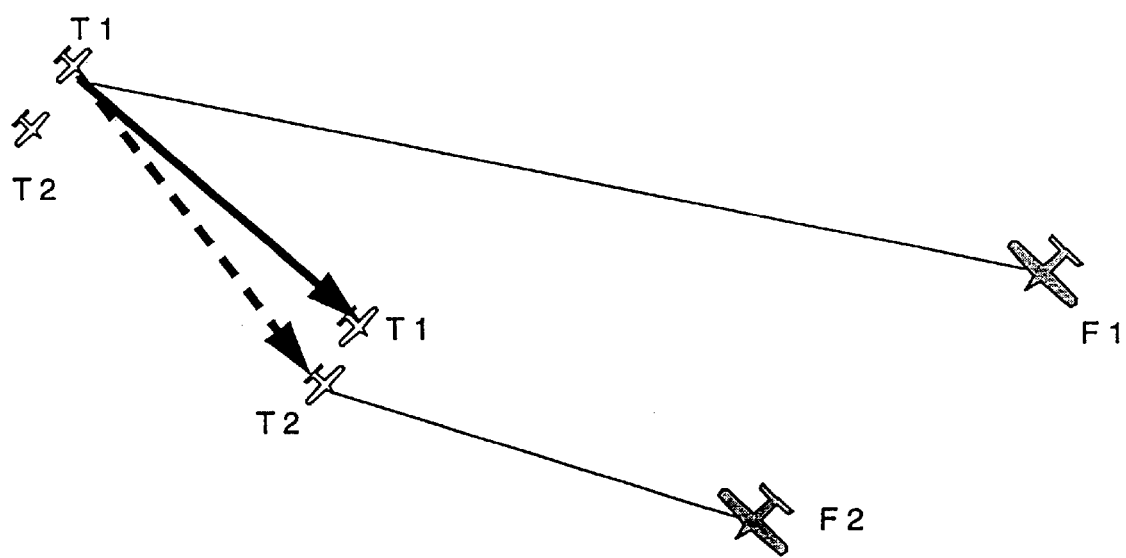
FIG. 2 shows a situation, in which the position and the velocity vector may be calculated erroneously when using a known method, FIG. 3 relates to the geometry involved for the methods according to the invention for determining the velocity vector and the position of a moving target using two radar platforms.
Figure 4:
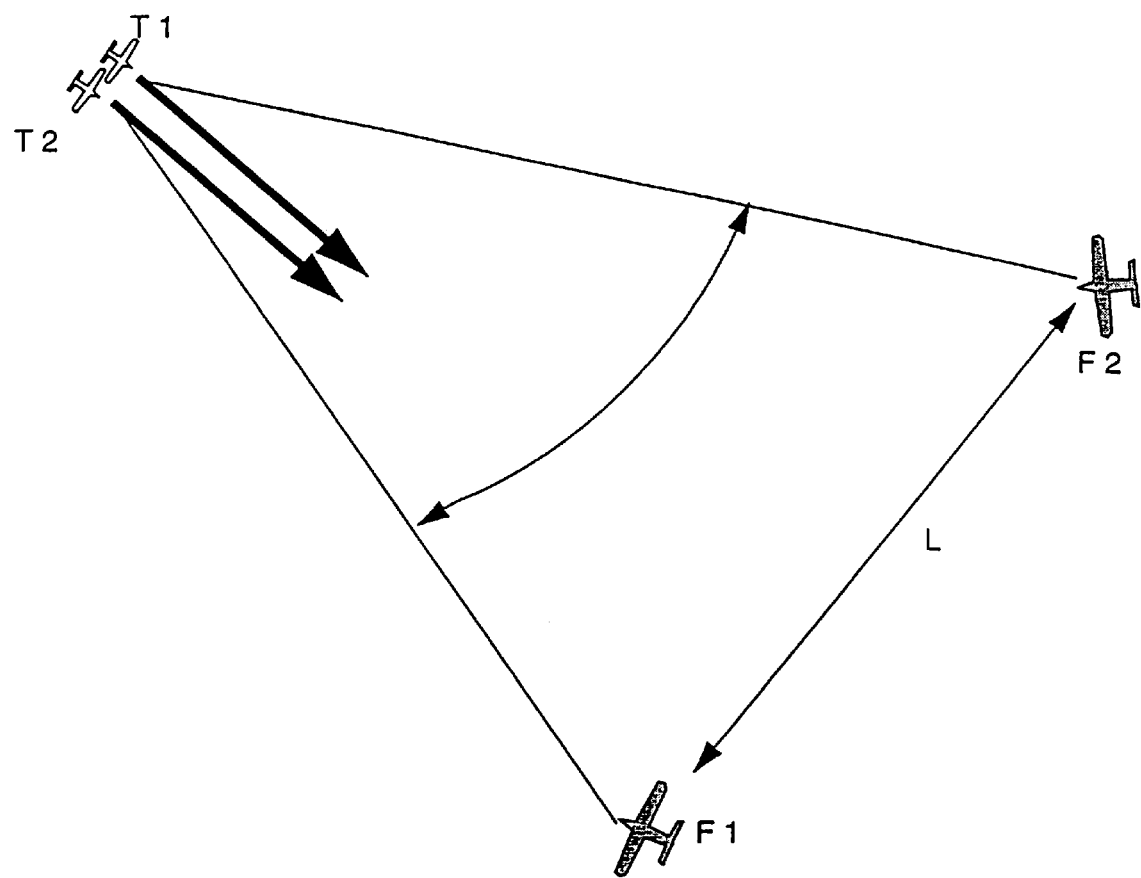
FIG. 4 shows the geometry involved for the present invention in a situation, in which two objects move at like speeds and directions, FIG. 5 relates to the geometry involved for the methods according to the invention for determining the velocity vector and the position of a moving target advantageously by using a single moving platform.

As can readily be understood, a situation in which aircrafts are flying close to one another as shown in FIG. 4 will only give rise to minor errors when using the method as set out above. The determination of the velocity vector for the whole group of aircrafts flying in formation is not critical with regard to identifying and performing the measurements for the same particular aircraft in the group in comparison with the conventional methods mentioned above as discussed in connection with FIG. 2.

Assuming that the velocity vector of the object remains constant, it is seen that relations III and IV also apply during the travel of the object.

Hence, relation V can also be utilised for calculations based on measurements performed at different points in time under the assumption that the object is not changing its course or speed between these measurements.

As a special case, a single radar unit carried on a moving radar platform can be used, whereby the radar unit is performing measurements at different points in time. This method will provide reliable results on the condition that a satisfactory degree of rotation of the radar unit with regard to the object can be accomplished.

DESCRIPTION OF A PREFERRED SECOND EMBODIMENT OF THE INVENTION

Especially for the case of a single moving radar platform, a reliable method of conveying range information has been accomplished. The geometry related to this situation has been shown in FIG. 5.

F1 denotes a first radar platform at time $t_1$ and F2 denotes the same radar platform at a later time, $t_2$, or alternatively another radar platform at this later point in time.

Figure 5:
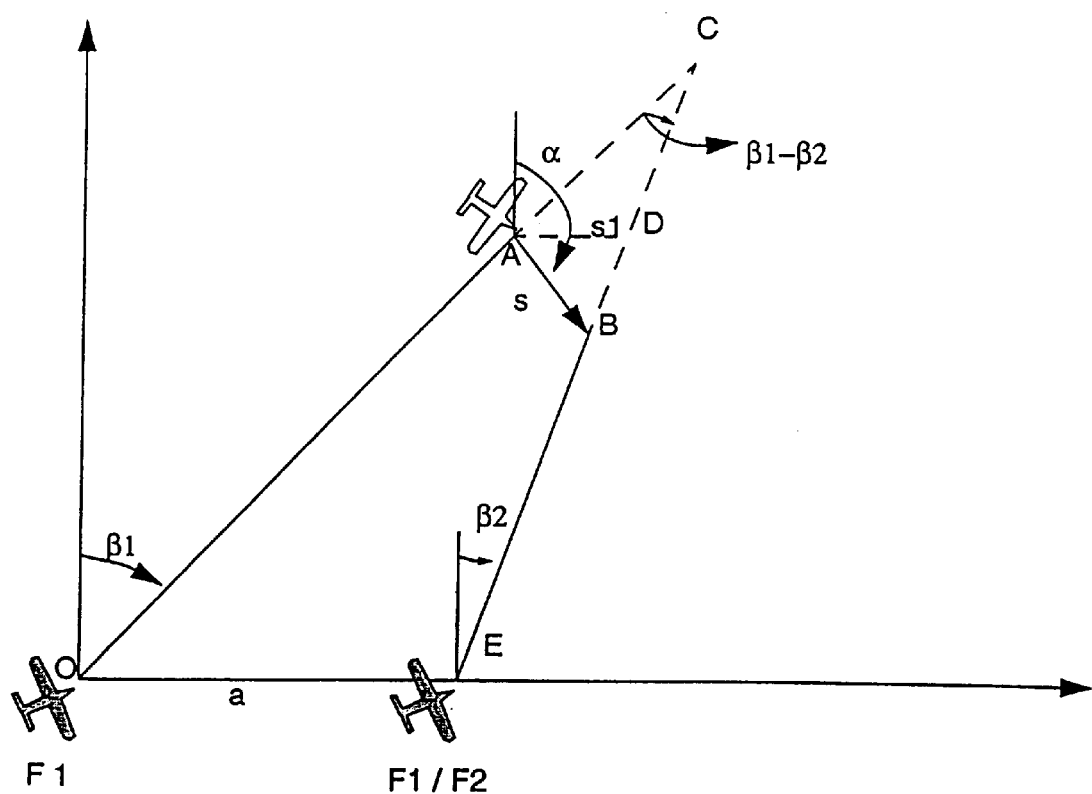

The co-ordinate system shown in FIG. 5 has been chosen such that the origin, O, coincides with the position of F1 and such that the position of F2, E, intersects with the x-axis.

The object has the position A when it is observed by F1 and the position B when it is observed from F2.

The distance the object has travelled between the locations A and B at which the measurements are made is denoted s. It should be noted that the distance s can be expressed as:

$$s = v \cdot (t_2 - t_1), \tag{VII}$$

where v is the speed of the moving object.

The displacement of the radar platform F1/F2 between the measurements is denoted a; $\beta_1$ and $\beta_2$ denote the angular directions to the object with respect to the normal to the path of travel of the radar platform. Again, $\alpha$ denotes the angle of the velocity vector of the object.

The respective bearing lines from the radar platform F1/F2 towards the object are crossing one another at point C. The distance $s_1$ is the line segment of a line parallel with the x-axis from point A to a point D on the line E-C.

The distance to the object at $t_1$ is the line O-A and is denoted R. The line O-C is denoted $R_0$.

The theorem of sine gives:

$$\frac{a}{\sin(\beta_1 - \beta_2)} = \frac{R_0}{\sin(90° + \beta_2)} = \frac{R_0}{\cos(\beta_2)}. \tag{VIII}$$

The line $s_1$, which is parallel to the x-axis, can be calculated according to:

$$s_1 = s \cdot \frac{\sin(\alpha - \beta_2)}{\cos(\beta_2)}. \tag{IX}$$

Furthermore, the two like triangles O-C-E and A-C-D gives that:

$$\frac{R_0}{a} = \frac{R_0 - R}{s_1} = \frac{(R_0 - R) \cdot \cos(\beta_2)}{s \cdot \sin(\alpha - \beta_2)}, \tag{X}$$

whereby $$R = R_0 \cdot \left(1 - \frac{s \cdot \sin(\alpha - \beta_2)}{a \cdot \cos(\beta_2)}\right). \tag{XI}$$

Inserting the expression for $R_0$ in X, the distance to the object R can be found $$R = \frac{a}{\sin(\beta_1 - \beta_2)} \cdot \left(\cos(\beta_2) - \frac{s}{a} \cdot \sin(\alpha - \beta_2)\right). \tag{XII}$$

In this way, the distance to the object, R, can be determined from the measurements of the angular direction to the object and the radial speed of the object, under the assumption that the speed and course (v, $\alpha$) of the moving object is constant.

The distance, s, the object has travelled, is found from relation VII using relations V and VI and inserted in XII.

From both above situations relating to the first and second embodiment of the present invention, it is noted that the relations found are derived on the assumption that objects and radar-platforms are disposed in or are moving in a plane.

When applying the invention to movements in three-dimensional space—i.e. observing aircrafts and/or utilising airborne radar-platforms—it appears in practice that the above relations provide reliable results, even if radial speed measurements are inserted directly in the above relations ignoring the inclination of the course of the object or the inclination to the object as seen from the radar platform.

This is mainly because the height variation which appear for many aircraft applications is within the range of tens of km or less, while the horizontal range may lie in the range of hundreds of km. Moreover, aircrafts that change altitude do normally not sustain a constant speed.

When an object is moving in a direction perpendicular to the radar platform, the measured radial velocity becomes zero according to relation III and IV. Therefore, if an object for instance has a horizontal heading and is passing over and between say two earth bound radar platforms (approaching $\alpha = 180°$, $\beta = \beta_2 = 90°$), the above relations do not give correct results. Therefore, it should generally be avoided using data for these situations.

Fortunately, in practice the time an aeroplane is flying over (or passing under) a radar-platform is typically small in relation to its approaching the platform and subsequent fading away. Following this train of thought, it is desirable to make certain interpretations based on the history of the measurements and for instance leave out certain results.

If more platforms are deployed at a certain distance from one another, it is possible to utilise information from only those radar units, which provide reliable results. In practice, three dispersed units can be utilised to overcome this situation.

It is noted that for the special case where measurements are performed at one point in time from two locations according to the invention, the velocity vector is determined according to a plane defined by the three locations of the radar units F1, F2 and the object T, respectively.

It should also be noted that the above set of relations apply to any two dimensional plane. For instance, it is possible to deploy two flying radar-platforms above one another and in this way gain information about objects relating to a vertical plane defined by the radar units.

The components of the velocity vector of the object in directions perpendicular to this plane will not yield any contributions to the radial speed measurements.

The plane according to which the velocity vector is determined can be determined by measuring for instance the inclination and the angle to the object from the radar units in relation to a given reference co-ordinate system such as the co-ordinate system used in the navigational system. These measurements can be achieved by known radar units. Then, an appropriate transformation of the velocity vector according to the co-ordinate system, defined by the radar units and the target to a desired reference co-ordinate system can be carried out. Such transformations are generally known.

If not only two measurements are performed, but more measurements are performed from positions in such a way that at least two radial velocity vector determinations of the object according to any two planes intersecting one another are made, information about the third dimension of the velocity vector of the object is gained.

In this way, by using at least three measuring locations for the radar-platforms, being arranged such that these locations and the object are not situated in a single plane, three-dimensional information of objects moving in three-dimensional space is gained using the above relations.

Without departing from the scope of the appended claims, it is envisaged that known radar methods can be used so as to complement the methods defined in the appended claims, for instance for enabling a further interpretation of results or for gaining or enhancing reliability of the provided results and of those systems the invention is implemented in.

What is claimed is:

1. A method for determining movement information of a moving object from data provided by a radar system comprising at least one radar unit (F1, F2), whereby the at least one radar unit (F1, F2) is scanning objects in a given plane and is determining the radial speed ($v_1$, $v_2$) of the moving object, the at least one radar unit (F1, F2) is furthermore determining the angle ($\beta_1$, $\beta_2$) to the moving object with respect to a predetermined co-ordinate system, whereby two measurements of said radial speed ($v_1$, $v_2$) and said angle ($\beta_1$, $\beta_2$) are performed by means of the at least one radar unit (F1, F2) at two different positions, whereby the angle ($\alpha$) of the velocity vector ($v$, $\alpha$) of an object with respect to the predetermined co-ordinate system is determined according to $$\alpha = tg^{-1}\left(\frac{v_2\cos(\beta_1) - v_1\cos(\beta_2)}{v_1\sin(\beta_2) - v_2\sin(\beta_1)}\right)$$

and the speed ($v$) of the velocity vector ($v$, $\alpha$) is determined according to $$v = -\frac{v_1}{\cos(\alpha - \beta_1)} \quad \text{or} \quad v = -\frac{v_2}{\cos(\alpha - \beta_2)}.$$

2. The method according to claim 1, wherein said measurements ($v_1$, $v_2$; $\beta_1$, $\beta_2$) are performed simultaneously using two radar units (F1, F2) being displaced at an angle from one another with regard to the object, whereby the radar units (F1, F2) comprise communication means for transferring the measurements.

3. The method according to claim 1, wherein the measurements ($v_1$, $v_2$; $\beta_1$, $\beta_2$) are performed at least at two different points in time ($t_1$, $t_2$) and space by a single moving radar unit (F1).

4. The method according to claim 3, wherein the distance (a) the radar unit or units (F1/F2) travels between the points in time ($t_1$, $t_2$) at which the measurements ($v_1$, $v_2$; $\beta_1$, $\beta_2$) are performed is determined according to navigation equipment associated with the radar unit or units (F1) and wherein the distance (R) from the radar unit to the object at the position where the first measurement is made is determined according to $$R = \frac{a}{\sin(\beta_1 - \beta_2)} \cdot \left(\cos(\beta_2) - \frac{s}{a} \cdot \sin(\alpha - \beta_2)\right),$$

and where the distance the object is travelling between the points in time ($t_1$, $t_2$) is calculated from said determination of the speed ($v$) of the velocity vector ($v$, $\alpha$) of the moving object according to $$s = v \cdot (t_2 - t_1).$$

5. The method of claim 3, wherein the determination of the velocity vector ($v$, $\alpha$) is performed when said velocity vector remains constant during the time between the measurements.

6. The method according to claim 1, wherein the measurements ($v_1$, $v_2$; $\beta_1$, $\beta_2$) are performed at least at two different points in time ($t_1$, $t_2$) by a plurality of radar units (F1, F2) having communication means for transferring the measurements.

7. The method of claim 4, wherein the determination of the velocity vector ($v$, $\alpha$) is performed when said velocity vector remains constant during the time between the measurements.

* * * * *